United States Patent
Weng et al.

(10) Patent No.: US 11,765,454 B2
(45) Date of Patent: Sep. 19, 2023

(54) IMAGE CONTROL METHOD AND DEVICE, AND MOBILE PLATFORM

(71) Applicant: SZ DJI TECHNOLOGY CO., LTD., Shenzhen (CN)

(72) Inventors: Chao Weng, Shenzhen (CN); Qi Zhou, Shenzhen (CN); Li Qiu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 132 days.

(21) Appl. No.: 17/383,216

(22) Filed: Jul. 22, 2021

(65) Prior Publication Data

US 2021/0360164 A1    Nov. 18, 2021

Related U.S. Application Data

(63) Continuation of application No. PCT/CN2019/073045, filed on Jan. 24, 2019.

(51) Int. Cl.
*H04N 23/661* (2023.01)
*H04N 7/18* (2006.01)
(Continued)

(52) U.S. Cl.
CPC .......... *H04N 23/662* (2023.01); *H04N 7/181* (2013.01); *H04N 23/45* (2023.01); *H04N 23/675* (2023.01)

(58) Field of Classification Search
CPC ...... H04N 23/662; H04N 7/181; H04N 23/45; H04N 23/675; H04N 7/185; H04N 23/62;
(Continued)

(56) References Cited

U.S. PATENT DOCUMENTS 9,896,205 B1    2/2018  Gohl et al.
2006/0187312 A1    8/2006  Labaziewicz et al.
(Continued)

FOREIGN PATENT DOCUMENTS

CN    1210418 A    3/1999
CN    201945780 U    8/2011
(Continued)

OTHER PUBLICATIONS

Bingliang Hu, "Auto Adjust Focusing of Verity Focus", Acta Photonica Sinica, vol. 32, No. 8, pp. 1004-1006, Aug. 2003.
(Continued)

*Primary Examiner* — Michael E Teitelbaum
(74) *Attorney, Agent, or Firm* — ANOVA LAW GROUP, PLLC

(57) ABSTRACT

An image control method includes receiving, by a camera, a photographing instruction transmitted by an image display device. The camera includes a first image sensor and a second image sensor. The method further includes controlling the second image sensor to perform photographing according to the photographing instruction to obtain a display code stream and transmitting the display code stream to the image display device. The photographing instruction is used to instruct the second image sensor to photograph for a partial area of a first image using a focal length to obtain a second image. The first image is obtained by the first image sensor and displayed in a main display window of the image display device. The display code stream includes a code stream corresponding to the second image sensor.

18 Claims, 11 Drawing Sheets

(51) Int. Cl.
*H04N 23/45* (2023.01)
*H04N 23/67* (2023.01)

(58) Field of Classification Search
CPC .... H04N 23/63; H04N 23/631; H04N 23/635; H04N 23/69; H04N 23/57; H04N 23/661; H04N 23/667; G05D 1/02
See application file for complete search history.

(56) References Cited

U.S. PATENT DOCUMENTS

2016/0316155 A1* 10/2016 Richards ................ H04N 23/80
2018/0157252 A1   6/2018 Lee et al.
2018/0270445 A1*  9/2018 Khandelwal ....... H04N 21/4728

FOREIGN PATENT DOCUMENTS

| CN | 105979147 A | 9/2016 |
| CN | 106550193 A | 3/2017 |
| CN | 106586011 A | 4/2017 |
| CN | 206743363 U | 12/2017 |
| CN | 108171989 A | 6/2018 |
| CN | 108449592 A | 8/2018 |

OTHER PUBLICATIONS

The World Intellectual Property Organization (WIPO) International Search Report for PCT/CN2019/073045 dated Oct. 2019 4 pages (translation included).

* cited by examiner

IMAGE CONTROL METHOD AND DEVICE, AND MOBILE PLATFORM

CROSS-REFERENCE TO RELATED APPLICATION

This application is a continuation of International Application No. PCT/CN2019/073045, filed Jan. 24, 2019, the entire content of which is incorporated herein by reference.

TECHNICAL FIELD

The present disclosure generally relates to the image processing technology field and, more particularly, to an image processing method and device, and a mobile platform.

BACKGROUND

With the rapid development of unmanned aerial vehicles (UAVs), UAVs are applied more and more broadly. A UAV can carry a camera. During the flight of the UAV, the camera collects images at various angles and attitudes. The images collected by the camera are transmitted to a ground control end by the UAV. The images can be displayed at the ground control end.

A conventional camera usually includes a lens. The camera performs zoom photographing on a portion of a picture captured by the camera. The zoomed picture is displayed at the ground control end.

With the development of cameras, a camera may include two lenses, for example, a fixed-focus wide-angle lens and a zoom lens. A solution of how to use two lenses to achieve zoom function and image display needs to be solved.

SUMMARY

Embodiments of the present disclosure provide an image control method. The method includes receiving, by a camera, a photographing instruction transmitted by an image display device. The camera includes a first image sensor and a second image sensor. The method further includes controlling the second image sensor to perform photographing according to the photographing instruction to obtain a display code stream and transmitting the display code stream to the image display device. The photographing instruction is used to instruct the second image sensor to photograph for a partial area of a first image using a focal length to obtain a second image. The first image is obtained by the first image sensor and displayed in a main display window of the image display device. The display code stream includes a code stream corresponding to the second image sensor.

Embodiments of the present disclosure provide a camera device including a communication interface, a first image sensor, a second image sensor, a processor, and a memory. The memory stores program codes that, when executed by the processor, cause the processor to control the communication interface to receive a photographing instruction transmitted by an image display device, control the second image sensor to perform photographing according to the photographing instruction to obtain a display code stream, and control the communication interface to transmit the display code stream to the image display device. The photographing instruction is used to instruct the second image sensor to photograph for a partial area of a first image using a focal length to obtain a second image. The first image is obtained by the first image sensor and displayed in a main display window of the image display device. The display code stream includes a code stream corresponding to the second image sensor.

DETAILED DESCRIPTION OF THE EMBODIMENTS

Figure 1:
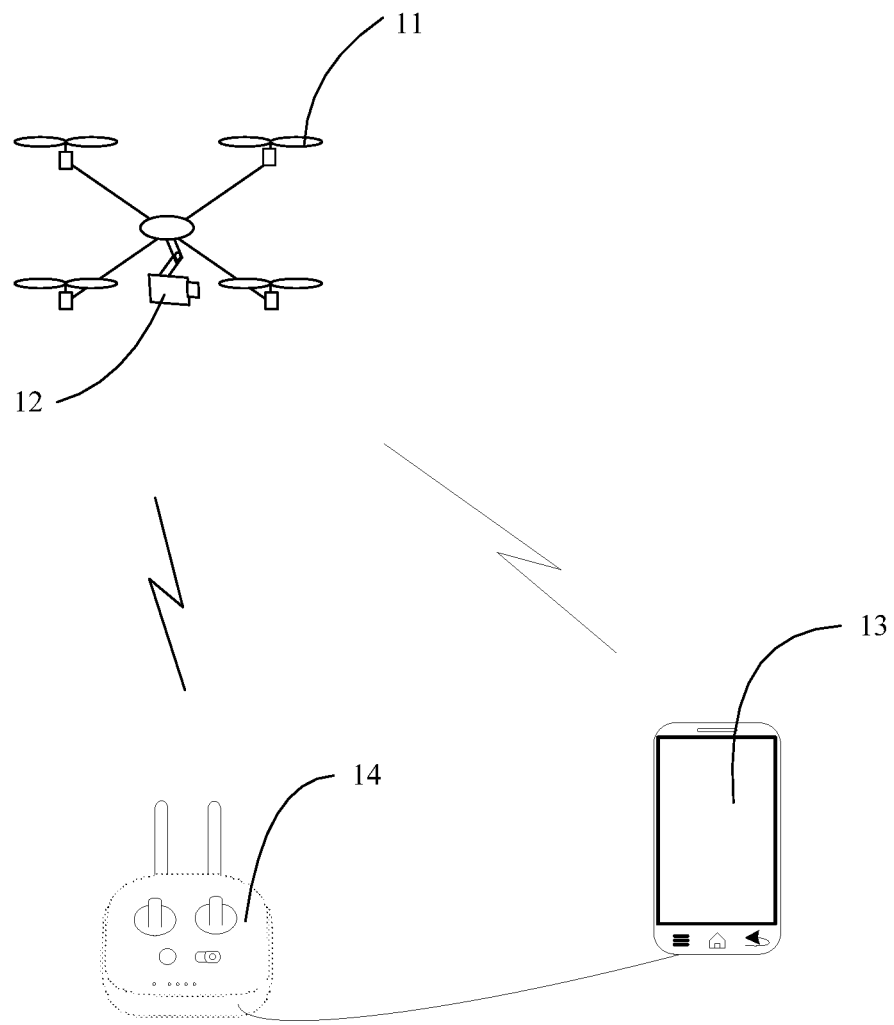
FIG. 1 is a schematic architectural diagram of a mobile platform system according to some embodiments of the present disclosure.

The present disclosure provides an image control method and device, and a mobile platform, which may be applied to a mobile platform system. FIG. 1 is a schematic architectural diagram of a mobile platform system according to some embodiments of the present disclosure. As shown in FIG. 1, the mobile platform system includes a mobile platform 11, a camera device 12, and an image display device 13. The camera device 12 is carried by the mobile platform 11. In some embodiments, the camera device 12 may be mounted at the mobile platform 11 by a gimbal. The image display device 13 may be installed with an application program. The image display device 13 may control the mobile platform 11 and display related information of the mobile platform 11 and/or the camera device 13 through the application program. For example, the image display device 13 may display an image captured by the camera device 13. In some embodiments, the mobile platform system further includes a control device 14. The control device 14 may be configured to control the mobile platform 11. The present disclosure does not limit the implementation of the mobile platform 11, the camera device 12, the image display device 13, and the control device 14. In some embodiments, the mobile platform 11 may include an unmanned aerial vehicle (UAV), an unmanned car, etc. The UAV may include a rotorcraft, for example, a multi-rotor aircraft propelled through the air by a plurality of propulsion devices. The camera device 12 may include a camera, a recording device, or etc. The image display device 13 may include a smartphone, a tablet computer, etc. The control device 14 may include a joystick remote controller.

Figure 2A:
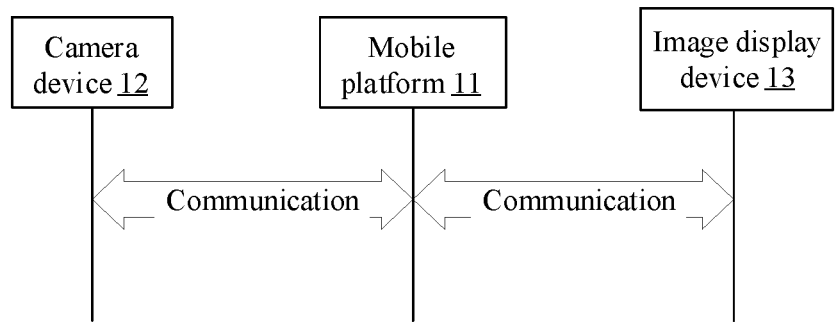
FIG. 2A is a schematic diagram showing an internal communication of a mobile platform system according to some embodiments of the present disclosure.

In some embodiments, FIG. 2A is a schematic diagram showing an internal communication of a mobile platform system according to some embodiments of the present disclosure. As shown in FIG. 1 and FIG. 2A, the mobile platform 11 and the camera device 12 communicate based on a communication protocol in a wireless or wired manner. The communication protocol may include an internal communication protocol of the mobile platform 11, or another existing communication protocol, or a customized communication protocol between the mobile platform 11 and the camera device 12. The mobile platform 11 and the image display device 13 may communicate wirelessly through a wireless network. The wireless network may include a wireless ad hoc network, such as wireless fidelity (WIFI). The wireless network may also include a public wireless communication network.

Figure 2B:
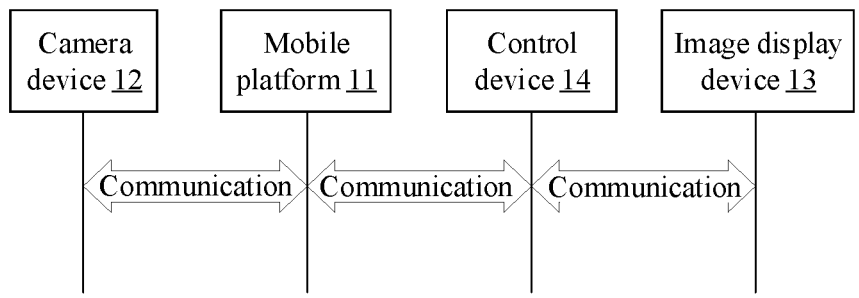
FIG. 2B is a schematic diagram showing another internal communication of a mobile platform system according to some embodiments of the present disclosure.

In some embodiments, FIG. 2B is a schematic diagram showing another internal communication of a mobile platform system according to some embodiments of the present disclosure. As shown in FIG. 1 and FIG. 2B, the mobile platform 11 and the camera device 12 communicate based on a communication protocol in a wireless or wired manner. For the communication mode, reference may be made to the description of FIG. 2A, which is not repeated here. The mobile platform 11 and the image display device 13 may also communicate with each other through the control device 14. In some embodiments, the control device 14 and the image display device 13 may be connected wirelessly, that is, may perform wireless communication through a wireless network. In some embodiments, the control device 14 and the image display device 13 may be connected in a wired manner, for example, through a universal serial bus (USB) interface. The mobile platform 11 and the control device 14 may communicate wirelessly through the wireless network.

The technical solutions of embodiments of the present disclosure are clearly described below in connection with the accompanying drawings of embodiments of the present disclosure. Described embodiments are some embodiments of the present disclosure, not all embodiments of the present disclosure. Based on embodiments of the present disclosure, all other embodiments obtained by those of ordinary skill in the art without creative effort are within the scope of the present disclosure.

In some embodiments, the movable platform 11 may include a UAV, and the camera device 12 may include a camera. In embodiments of the present disclosure, an attitude of the gimbal and an attitude of the camera device may include a same meaning.

Figure 3:
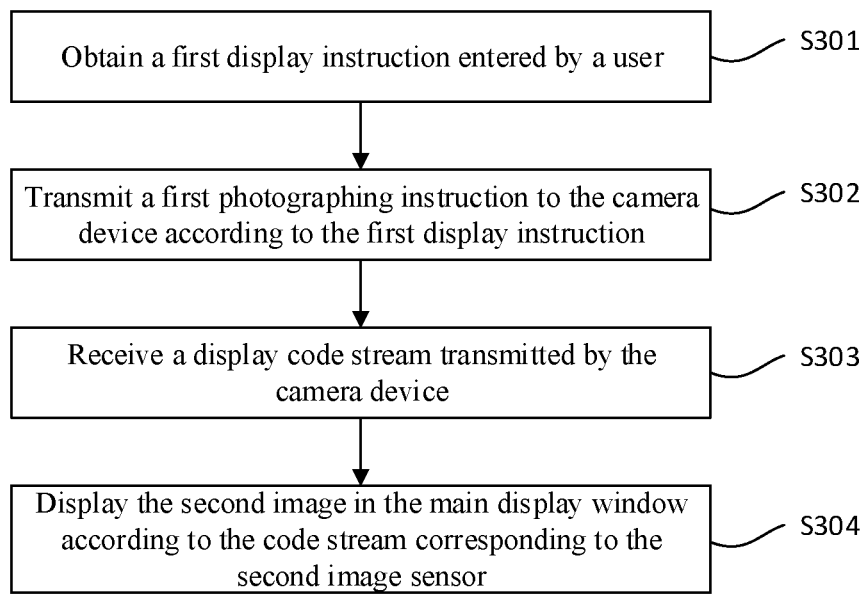
FIG. 3 is a schematic flowchart of an image control method according to some embodiments of the present disclosure.

FIG. 3 is a schematic flowchart of an image control method according to some embodiments of the present disclosure. In the image control method of embodiments of the present disclosure, an execution subject may include an image display device. The image display device may be configured to display a picture obtained by the camera device. As shown in FIG. 3, the image control method of embodiments of the present disclosure includes the following processes.

At S301, a first display instruction entered by a user is obtained.

The first display instruction may be used to instruct to perform zoom photographing on a partial area of a first image displayed by a main display window of the image display device. The first image may be obtained by a first image sensor of the camera device.

At S302, a first photographing instruction is transmitted to the camera device according to the first display instruction. The first photographing instruction may be used to instruct a second image sensor of the camera device to obtain a second image of the partial area by using a first focal length.

At S303, a display code stream transmitted by the camera device is received.

The display code stream may include a code stream corresponding to the second image sensor. At S304, the second image is displayed in the main display window according to the code stream corresponding to the second image sensor.

Figure 4A:
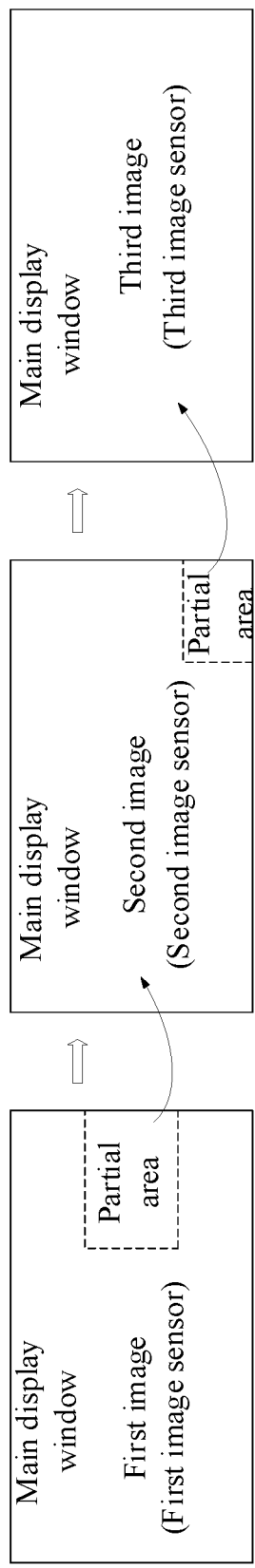
FIG. 4A to FIG. 4D are schematic diagrams showing a display interface of an image display device according to some embodiments of the present disclosure.

FIG. 4A is a schematic diagram showing a display interface of an image display device according to some embodiments of the present disclosure. As shown on the left side of FIG. 4A, a main display window is displayed on a display (not shown) of the image display device. Currently, the main display window displays the first image. The first image may be captured by the first image sensor of the camera device. By obtaining the first display instruction entered by the user, the camera device may be instructed to perform zoom photographing on the partial area of the first image. Performing zoom photographing may include performing photographing by using the second image sensor of the camera device with the first focal length. Subsequently, as shown in the middle portion of FIG. 4A, the image display device displays the second image, which is obtained by the second image sensor performing zoom photographing on the partial area, in the main display window.

The image control method of embodiments of the present disclosure may be applied to a scene of using two image sensors of the camera device to realize a zoom photographing function and displaying a zoom picture at the image display device. By obtaining the first display instruction entered by the user, the camera device may be instructed to need to use the other one of the two image sensors to perform zoom photographing on the partial area in the picture captured by one of the two image sensors. The image display device may transmit the first photographing instruction to the camera device, so that the camera device may perform photographing according to the first photographing instruction, and transmit the code stream obtained by photographing to the image display device. The image display device may display the second image obtained by performing zoom photographing on the partial area of the first image according to the code stream. Thus, the zoom photographing function of smoothly switching from one image sensor of the camera device to another image sensor may be realized. The zoom picture may be smoothly switched and displayed on the image display device. The flexibility of zoom photographing and image display in a scene with a plurality of image sensors may be improved. The application scene of the zoom photographing and the image display may be expanded, which satisfies user needs.

The image control method of embodiments of the present disclosure may be applied to a scene where the camera device includes two image sensors or, to a scene where the camera device includes more than two image sensors. The method is applicable to any situation as long as one of the image sensors is configured to perform zoom photographing on the partial area of the picture captured by another image sensor.

Embodiments of the present disclosure do not limit the implementation of the first image sensor and the second image sensor and whether they are arranged in one lens. For example, both image sensors may include visible light image sensors. In some embodiments, the two image sensors may be a visible light image sensor and an infrared image sensor, respectively. For another example, both image sensors may include zoom image sensors. In some embodiments, the two image sensors may include a fixed focal length image sensor and a zoom image sensor, respectively. For example, the two image sensors may be arranged in the same lens of the camera device, or the two image sensors may be arranged in different lenses of the camera device, respectively.

Embodiments of the present disclosure do not limit focal length ranges of the first image sensor and the second image sensor. In some embodiments, a maximum focal length of the first image sensor may be smaller than a minimum focal length of the second image sensor. For example, the first image sensor may include a fixed focal length wide-angle image sensor, and the second image sensor may include a high-magnification zoom image sensor. A focal length of the fixed focal length wide-angle image sensor may be smaller than a minimum focal length of the high-magnification zoom image sensor. In some embodiments, a partial overlap area between a focal length range of the first image sensor and a focal length range of the second image sensor may exist. For example, the focal length range of the first image sensor may include 10 to 50 mm, and the focal length range of the first image sensor may include 40 to 200 mm.

Embodiments of the present disclosure do not limit the implementation of the first display instruction. The first display instruction may be obtained in different manners. The first display instruction may include different contents. Methods and subject of determining the partial area may be different, which is described below.

In some embodiments, the display code stream may include the code stream corresponding to the first image sensor. The image control method of embodiments of the present disclosure may further include displaying the picture captured by the first image sensor in a secondary display window according to the code stream corresponding to the first image sensor.

In some embodiments, a size of the secondary display window may be smaller than a size of the main display window. The secondary display window may be displayed and superimposed at a predetermined area of the main display window.

Figure 4B:
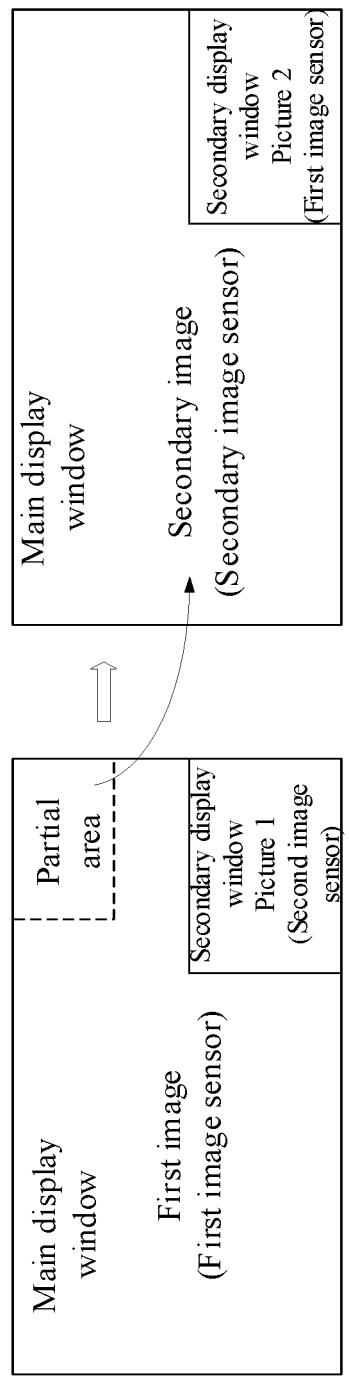

In some embodiments, FIG. 4B is a schematic diagram showing a display interface of an image display device according to some embodiments of the present disclosure. As shown on the left side of FIG. 4B, the main display window currently displays the first image. The first image may be captured by the first image sensor of the camera device. In the lower right corner of the main display window is the secondary display window. The secondary display window currently displays as picture 1. Picture 1 may be captured by the second image sensor of the camera device. By obtaining the first display instruction entered by the user, the image display device may be instructed to perform zoom photographing on the partial area of the first image by using the second image sensor. Then, the image display device may receive the display code stream transmitted by the camera device. A display effect is shown on the right side of FIG. 4B. The main display window displays the second image obtained by performing zoom photographing on the partial area using the second image sensor. The secondary display window displays picture 2. Picture 2 may be taken by the first image sensor of the camera device.

The first image and picture 2 may be captured by the first image sensor at different times. The second image and picture 1 may be captured by the second image sensor at different times and using different focal lengths.

In such an implementation manner, the image display device may include two display windows, e.g., the main display window and the secondary display window, respectively. In a process of realizing the zoom photographing function by using the two image sensors of the camera device, the main display window and the secondary display window may exchange and display the pictures captured by the two image sensors, respectively.

In some embodiments, in the application scene shown in FIG. 2A, an instruction and/or a code stream may be transmitted between the image display device and the camera device through the mobile platform. In some embodiments, in the application scene shown in FIG. 2B, the image display device is connected to the control device. The instruction and/or the code stream may be transmitted between the image display device and the camera device through the mobile platform and the control device.

The instruction may include any instruction transmitted between the image display device and the camera device, e.g., the first display instruction, the first photographing instruction, etc. The code stream may include any code stream transmitted between the image display device and the camera device, e.g., display code stream.

In some embodiments, the image control method of embodiments of the present disclosure further includes obtaining a second display instruction entered by the user. the second display instruction may be used to instruct to perform zoom photographing on the partial area of the second image displayed in the main display window.

The second photographing instruction may be transmitted to the camera device according to the second display instruction. The second photographing instruction may be used to instruct the second image sensor to obtain a third image of a partial area in the second image using a second focal length.

As shown in the middle of FIG. 4A, the main display window currently displays the second image. The second image may be captured by the second image sensor of the camera device using the first focal length. By obtaining the second display instruction entered by the user, the camera device may be instructed to continue to perform zoom photographing on the partial area of the second image using the second image sensor. Subsequently, as shown on the right side of FIG. 4A, the image display device displays the third image obtained by the second image sensor, which performs the zoom photographing on the partial area of the second image by using the second focal length, in the main display window.

The manner of obtaining the second display instruction entered by the user may be similar to the manner of obtaining the first display instruction entered by the user, which is described in detail below.

In this implementation, the zoom photographing may be continued to be performed on the partial area of the image displayed in the main display window.

In some embodiments, the image control method of embodiments of the present disclosure further includes obtaining a first return instruction entered by the user. The first return instruction may be used to instruct to display a fourth image in the main display window.

A third photographing instruction may be transmitted to the camera device according to the first return instruction. The third photographing instruction may be used to control the camera device to obtain the fourth image by using the first image sensor with an attitude before receiving the first photographing instruction.

The photographing code stream transmitted by the camera device may be received.

The fourth image may be displayed in the main display window according to the first return instruction and the photographing code stream.

In some embodiments, the image control method of embodiments of the present disclosure further includes displaying the picture captured by the second image sensor in the secondary display window according to the code stream.

Figure 4C:
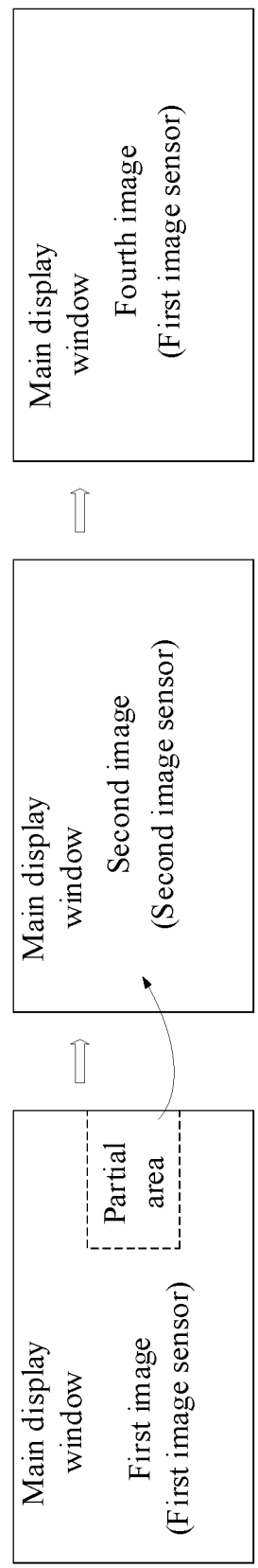

FIG. 4C is a schematic diagram showing a display interface of an image display device according to some embodiments of the present disclosure. The left side and middle of FIG. 4C are similar to the left side and middle of FIG. 4A, which are not repeated here. As shown in the middle of FIG. 4C, the main display window currently displays the second image. By obtaining the first return instruction entered by the user, the camera device may be instructed to perform photographing in the attitude before receiving the first photographing instruction. Subsequently, as shown on the right side of FIG. 4C, the image display device displays the fourth image captured by the first image sensor in the main display window. The camera device may obtain the first image and the fourth image in the same attitude.

In this implementation, after realizing the zoom photographing function by using the two image sensors of the camera device, and when returning to the display is needed, a current attitude of the camera device may be controlled to be the same as the attitude of the camera device before the camera device enters the zoom photographing function, which is convenient for subsequent photographing control and image display.

The image control method of embodiments of the present disclosure further includes obtaining a second return instruction entered by the user. The second return instruction may be used to instruct to display a fifth image in the main display window. The fifth image may be obtained by the first image sensor of the camera device at the current attitude.

The photographing code stream transmitted by the camera device may be received.

The fifth image may be displayed in the main display window according to the second return instruction and the photographing code stream.

In some embodiments, the image control method of embodiments of the present disclosure further includes displaying the picture captured by the second image sensor in the secondary display window according to the photographing code stream.

Figure 4D:
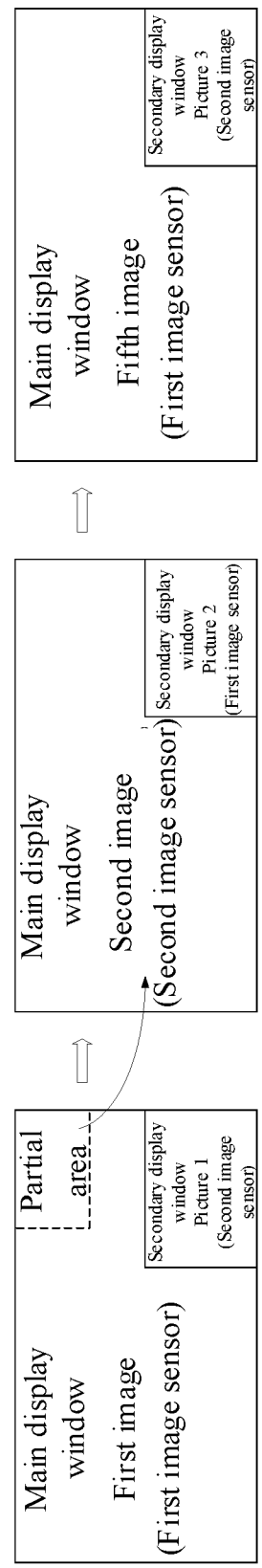

FIG. 4D is a schematic diagram showing a display interface of an image display device according to some embodiments of the present disclosure. The left side and middle of FIG. 4D are similar to the left side and middle of FIG. 4B, which is not repeated here. As shown in the middle of FIG. 4D, the main display window currently displays the second image. By obtaining the second return instruction entered by the user, the camera device may be instructed to perform photographing in the current attitude. Subsequently, as shown on the right side of FIG. 4D, the image display device displays the fifth image captured by the first image sensor in the current attitude of the camera device in the main display window. The image display device displays picture 3 captured by the second image sensor in the current attitude of the camera device in the secondary display window.

In this implementation, after realizing the zoom photographing function by using the two image sensors of the camera device, and when returning to the display is needed, the camera device may be controlled to continue to perform photographing in the current attitude, which simplifies the photographing control of the camera device.

In some embodiments, the first return instruction or the second return instruction entered by the user through the image display device or the control device may be obtained. For example, when the user clicks a "return" button on the display screen of the image display device, or when the user presses a "return" button arranged on the control device, the first return instruction or the second return instruction entered by the user may be obtained.

The image control method of embodiments of the present disclosure includes obtaining the first display instruction entered by the user. The first display instruction may be used to instruct to perform zoom photographing on the partial area of the first image displayed in a main display window of the image display device. The first image may be obtained by the first image sensor of the camera device. The first photographing instruction may be transmitted to the camera device according to the first display instruction. The display code stream transmitted by the camera device may be received. The second image may be displayed in the main display window according to the code stream corresponding to the second image sensor. In the image control method of embodiments of the present disclosure, the first display instruction entered by the user may instruct that the zoom photographing may need to be performed on the partial area of the picture captured by one image sensor of the camera device by using another image sensor. Thus, the flexibility of the zoom photographing and the image display in the scene of the plurality of image sensors may be improved. The application scene of the zoom photographing and the image display may be expanded, which satisfies the user needs.

Based on embodiments shown in FIG. 3 and FIGS. 4A to 4D, different implementations of obtaining the first display instruction entered by the user in process S301 are described in detail.

An image control method may be provided by embodiments of the present disclosure. In some embodiments, in process S301, obtaining the first display instruction entered by the user may include when detecting that the user performs a target position selection operation on the first image, obtaining the first display instruction. The first display instruction may include position information of a target position and the first focal length. Thus, when the main display window displays the second image, the predetermined position of the main display window may include the target position.

The partial area may be determined by the position information of the target position and the first focal length.

Figure 5:
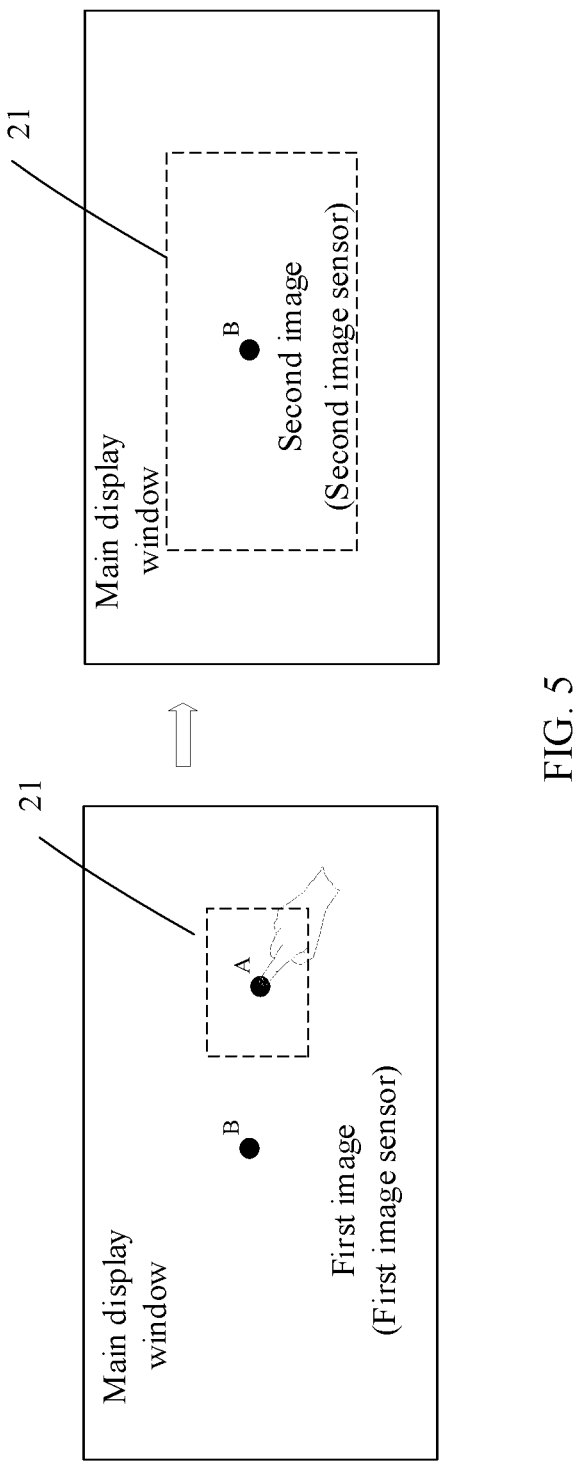
FIG. 5 is a schematic diagram showing a display interface of obtaining a first display instruction entered by a user according to some embodiments of the present disclosure.

FIG. 5 is a schematic diagram showing a display interface of obtaining a first display instruction entered by a user according to some embodiments of the present disclosure. As shown on the left side of FIG. 5, the user performs a click operation on the first image, and a clicked point is point A. When the image display device detects that the user performs the click operation on the first image, the first display instruction may be obtained. The first display instruction may include the position information of the target position (point A) and the first focal length. The first display instruction may be used to instruct that when the main display window displays the second image, predetermined position B of the main display window is target position A. Subsequently, as shown on the right side of FIG. 5, the image display device displays the second image obtained by the second image sensor performing zoom photographing on the partial area 21 using the first focal length in the main display window.

The image control method of embodiments of the present disclosure may implement the zoom photographing function of smoothly switching from one image sensor of the camera device to another image sensor based on a selected point entered by the user. The zoom picture may be smoothly switched and displayed in the image display device.

In some embodiments, the partial area 21 of the first image may be determined by the camera device according to the position information of the target position and the first focal length. The image display device may not need to determine the partial area 21 of the first image. For example, the partial area 21 may be centered at point A. When the second image sensor performs the zoom photographing by using the first focal length, any area of the second image may be displayed in the main display window.

Embodiments of the present disclosure do not limit the implementation of the target position selection operation, which may include, e.g., a single click operation, a double click operation, etc.

The position information of the target position may include a coordinate of the target position in a predetermined coordinate system. The predetermined coordinate system may include an image coordinate system. An origin of the image coordinate system may include a vertex of an upper left corner of the first image, or a center point of the main display window, which is not limited by embodiments of the present disclosure.

In some embodiments, the first focal length may include any one of a minimum focal length of the second image sensor, a product of a current focal length of the first image sensor and a predetermined zoom factor, and a predetermined focal length. The predetermined focal length may be greater than the minimum focal length of the second image sensor and smaller than a maximum focal length of the second image sensor.

Assume that the first image sensor may include a fixed focal length wide-angle image sensor with a focal length of 10 mm. The second image sensor may include a high-magnification zoom image sensor with a focal length range of 20-100 mm. The predetermined zoom factor may include 3× zoom. The predetermined focal length may be 40 mm.

In some embodiments, the first focal length may include the minimum focal length of the second image sensor, that is, the 20 mm. Thus, 2× zoom photographing may be realized for a partial area of the first image by using the two image sensors of the camera device.

In some other embodiments, the first focal length may include a product of the current focal length of the first image sensor and the predetermined zoom factor, that is, 10 mm×3=30 mm. Thus, 3× zoom photographing may be realized for the partial area of the first image by using the two image sensors of the camera device.

In some other embodiments, the first focal length may include the predetermined focal length, that is, the 40 mm. Thus, 4× zoom photographing may be realized for the partial area of the first image by using the two image sensors of the camera device.

Embodiments of the present disclosure do not limit specific values of the predetermined zoom factor and the predetermined focal length.

The implementation of the first photographing instruction is described below.

In some embodiment, the first photographing instruction may include the position information of the target position and the first focal length.

The position information of the target position may be used for the camera device to adjust the attitude, so that the predetermined position in the picture captured by the second image sensor is the target position. Thus, the predetermined position of the main display window may display an image corresponding to the target position.

In some other embodiments, the first photographing instruction may include the first focal length, a distance between the target position and the predetermined position of the main display window, and an angle between a direction of a straight line where the predetermined position of the main display window and the target position are located and a reference direction.

The distance between the target position and the predetermined position of the main display window, and the angle between the direction of the straight line where the target position and the predetermined position of the main display window are located and the reference direction may be used to adjust the attitude of the camera device. Therefore, the predetermined position in the picture captured by the second image sensor may include the target position. Correspondingly, the predetermined position of the main display window may display the image corresponding to the target position.

In some embodiments, the predetermined position of the main display window may include the center position of the main display window. Thus, a center point of the picture captured by the second image sensor and the center point of the main display window may both include the target position.

In some embodiments, the first photographing instruction may further include the position information of the main display window or the position information of the center position of the main display window.

the position information of the main display window or the position information of the center position of the main display window may be used to adjust the attitude of the camera device.

In the image control method of embodiments of the present disclosure, the zoom photographing function of smoothly switching from one image sensor of the camera device to another image sensor may be realized based on the selected point entered by the user, and the zoomed image may be smoothly switched and displayed in the image display device. The flexibility of the zoom photographing and the image display may be improved in the scene of the plurality of image sensors. The application scene of the zoom photographing and the image display may be expanded, which satisfies the user needs.

Embodiments of the present disclosure provide an image control method. In some embodiments, in process S301, obtaining the first display instruction entered by the user may include when detecting that the user performs an area selection operation on the first image, obtaining the first display instruction. the first display instruction may include the position information of the partial area to cause the predetermined position of the main display window to be the center position of the partial area when the main display window displays the second image.

Figure 6:
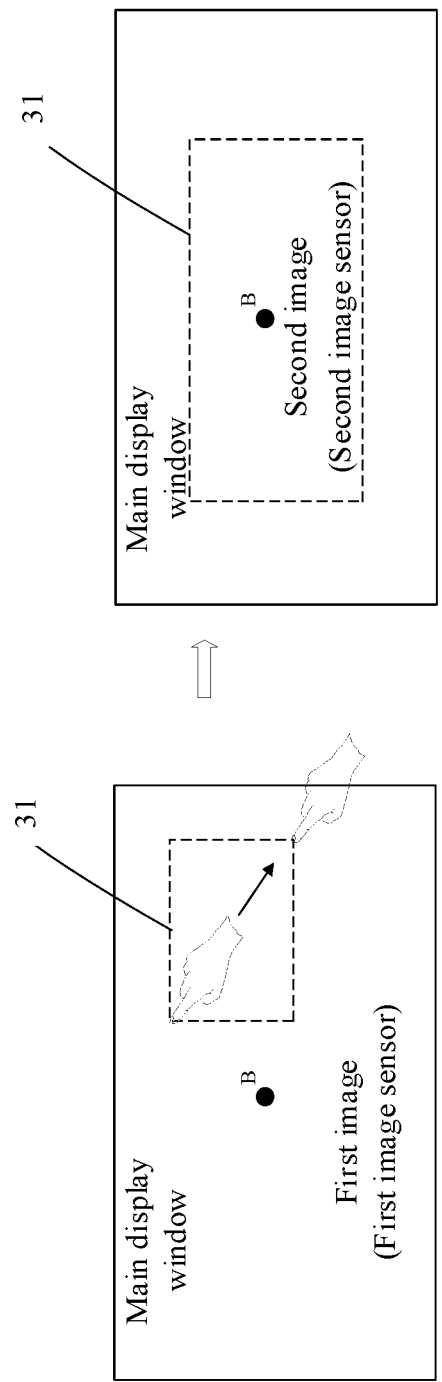
FIG. 6 is a schematic diagram showing another display interface of obtaining a first display instruction entered by a user according to some embodiments of the present disclosure.

FIG. 6 is a schematic diagram showing another display interface of obtaining a first display instruction entered by a user according to some embodiments of the present disclosure. As shown on the left side of FIG. 6, the user performs the area selection operation on the first image to determine the partial area 31. When the image display device detects that the user performs the area selection operation on the first image, the first display instruction may be obtained. The first display instruction may include position information of the partial area 31. The first display instruction may be used to instruct that when the main display window displays the second image, predetermined position B of the main display window may include a center position of the partial area 31. Subsequently, as shown on the right side of FIG. 6, the image display device may display the second image obtained by the second image sensor performing zoom photographing on the partial area 21 by using the first focal length in the main display window.

In the image control method of embodiments of the present disclosure, the zoom photographing function of smoothly switching from one image sensor of the camera device to another image sensor may be realized based on the selected area entered by the user, and the zoomed image may be smoothly switched and displayed in the image display device.

In some embodiments, the partial area 31 of the first image may be determined y the image display device.

Embodiments of the present disclosure do not limit specific implementation of the area selection operation, which may include, e.g., a sliding operation, a dragging operation, etc.

Embodiments of the present disclosure do not limit the position information of the partial area. For example, the position information of the partial area may include a coordinate of a contour point of the partial area in the predetermined coordinate system. The predetermined coordinate system may include the image coordinate system. The origin of the image coordinate system may include a vertex of an upper left corner of the first image, or the center point of the main display window, which is not limited by embodiments of the present disclosure.

The implementation of the first photographing instruction is described below.

In some embodiments, the first photographing instruction may include the position information of the partial area.

In some embodiments, the position information of the partial area may be used for the camera device to adjust the posture, so that the predetermined position in the picture captured by the second image sensor may include the center point of the partial area. Thus, the predetermined position of the main display window may display the image corresponding to the partial area. The position information of the partial area may be also used for the camera device to determine the first focal length.

In some other embodiments, in process S302, before transmitting the first photographing instruction to the camera device, the method may further include determining the first focal length according to the position information of the partial area.

Correspondingly, the first photographing instruction may include the information position of the partial area and the first focal length.

In some embodiments, the first focal length may be determined by the image display device and transmitted to the camera device.

How the image display device determines the first focal length is described below. The following various implementations may be also applicable to the camera device to determine the first focal length, or the image display device or the camera device to determine the second focal length.

In some embodiments, determining the first focal length according to the position information of the partial area may include obtaining a first ratio and a second ratio. The first ratio may include a ratio of a length of the partial area to a length of the main display window, and the second ratio may include a ratio of a width of the partial area to a width of the main display window.

The first focal length may be determined according to a maximum value of the first ratio and the second ratio.

In some embodiments, assume that the first ratio may include ⅓ and the second ratio may include ¼. The first ratio is greater than the second ratio. In some embodiments, a zoom factor may include a reciprocal of the maximum value of the first ratio and the second ratio, that is, 3× zoom. The first focal length may include the product of the current focal length of the first image sensor and the zoom factor. If the current focal length of the first image sensor is 10 mm, the first focal length may include the 30 mm. In some embodiments, the zoom factor may include a multiple of the reciprocal of the maximum value of the first ratio and the second ratio, for example, 6× zoom. Thus, the first focal length may include a 60 mm.

In some embodiments, determining the first focal length according to the position information of the partial area may include obtaining a third ratio. The third ratio may include a ratio of the length of the partial area and the width of the partial area.

If the third ratio is greater than a predetermined threshold, the first focal length may be determined to be the product of the predetermined ratio and the current focal length of the first image sensor.

If the third ratio is smaller than or equal to the predetermined threshold, the first focal length may be determined to be the product of the third ratio and the current focal length of the first image sensor.

In some embodiments, the predetermined position of the main display window may include the center position of the main display window. The center point of the picture captured by the second image sensor and the center point of the main display window may both include the center point of the partial area.

In some embodiments, the first photographing instruction may include the position information of the main display window or the position of the center position of the main display window.

In the image control method of embodiments of the present disclosure, the zoom photographing function of smoothly switching from one image sensor of the camera device to another image sensor may be realized based on the selected area entered by the user, and the zoomed image may be smoothly switched and displayed in the image display device. The flexibility of the zoom photographing and the image display may be improved in the scene of the plurality of image sensors, and the application scene of the zoom photographing and the image display may be expanded, which satisfies the user needs.

Figure 7:
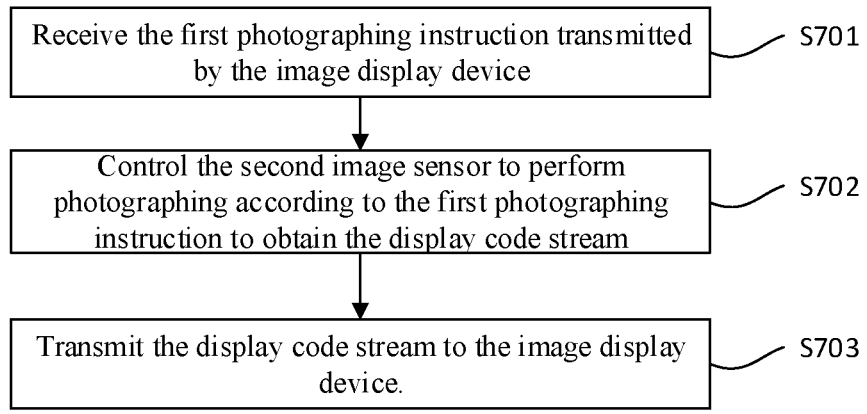
FIG. 7 is a schematic flowchart of an image control method according to some embodiments of the present disclosure.

FIG. 7 is a schematic flowchart of an image control method according to some embodiments of the present disclosure. In the image control method of embodiments of the present disclosure, the execution subject may include the camera device. The camera device includes the first image sensor and the second image sensor. As shown in FIG. 7, the image control method of embodiments of the present disclosure includes the following processes.

At S701, the first photographing instruction transmitted by the image display device is received.

The first photographing instruction may be used to instruct the second image sensor to obtain the second image for the partial area of the first image by using the first focal length. The first image may be obtained by the first image sensor and displayed in the main display window of the image display device.

At S702, the second image sensor is controlled to perform photographing according to the first photographing instruction to obtain the display code stream.

The display code stream may include the code stream corresponding to the second image sensor.

At S703, the display code stream is transmitted to the image display device.

For the first photographing instruction, reference may be made to the description of FIG. 3 to FIG. 6, which is not repeated here.

The image control method of embodiments of the present disclosure may be applied to a scene in which the zoom photographing function may be realized by using the two image sensors of the camera device. By receiving the first photographing instruction transmitted by the image display device, the zoom photographing may be instructed to be performed on the partial area of the picture captured by one image sensor by using another image sensor. Thus, the camera device may perform photographing according to the first photographing instruction to obtains the code stream corresponding to the second image sensor, and transmit the display code stream to the image display device. In the image control method of embodiments of the present disclosure, the zoom photographing function of smoothly switching from one image sensor of the shooting device to another image sensor may be realized, the flexibility of the zoom photographing and the image display may be improved in the scene of the plurality of image sensors, and the application scene of the zoom photographing and the image display may be expanded, which satisfies the user needs.

In some embodiments, the display code stream may further include the code stream corresponding to the first image sensor.

In some embodiments, in process S702, controlling the second image sensor to perform photographing according to the first photographing instruction to obtain the display code stream includes obtaining the current attitude of the camera device.

The first focal length may be obtained according to the first photographing instruction. The target attitude of the camera device may be obtained according to the first photographing instruction and the current attitude of the camera device. The target attitude may be used to make the second image sensor capture the partial area of the picture.

The second image sensor may be controlled to perform photographing at the target attitude to obtain the display code stream.

In some embodiments, with reference to FIG. 5 and FIG. 6, the second image sensor performs zoom photographing on the partial area of the first image. Since the partial area is not determined, the partial area may include any position in the first image. Therefore, when the second image sensor is used to perform photographing, a risk of being not able to capture the picture of the partial area may exist. Thus, the attitude of the camera device may be adjusted to the target attitude, so that the second image sensor may capture the picture of the partial area.

Embodiments of the present disclosure do not limit how to adjust the attitude of the camera device, which may be realized by an existing algorithm.

In some embodiments, the first photographing instruction may include the position information of the target position in the first image and the first focal length.

In some other embodiments, the first photographing instruction may include the first focal length, the distance between the target position and the predetermined position of the main display window, and the angle between the direction of the straight line where the target position and the predetermined position of the main display window are located and the reference direction.

The target attitude may be used to cause the predetermined position of the picture captured by the second image sensor to be the target position.

In some embodiments, the first focal length may include any one of the minimum focal length of the second image sensor, the product of the current focal length of the first image sensor and the predetermined zoom factor, and the predetermined focal length.

In some embodiments, the first photographing instruction may include the position information of the partial area of the first image and the first focal length.

The target attitude may be used to cause the predetermined position of the picture captured by the second image sensor to be the center position of the partial area.

In some embodiments, the first photographing instruction may include the position information of the partial area of the first image. The target attitude may be used to cause the predetermined position of the picture captured by the second image sensor to be the center position of the partial area.

Correspondingly, obtaining the first focal length according to the first photographing instruction may include determining the first focal length according to the position information of the partial area.

In some embodiments, determining the first focal length according to the position information of the partial area may include obtaining the position information of the main display window and obtaining the first ratio and the second ratio. The first ratio may include the ratio of the length of the partial area to the length of the main display window. The second ratio may include the ratio of the width of the partial area to the width of the main display window.

The first focal length may be determined according to the maximum value of the first ratio and the second ratio.

In some embodiments, the predetermined position of the picture captured by the second image sensor may include the center position of the picture.

In some embodiments, the first photographing instruction may include the position information of the main display window or the position information of the predetermined position of the main display window.

In some embodiments, the method may further include receiving the second photographing instruction transmitted by the image display device. The second photographing instruction may be used to instruct the second image sensor to obtain the third image of the partial area of the second image by using the second focal length.

The second image sensor may be controlled to perform photographing according to the second photographing instruction to obtain the photographing code stream. The photographing code stream may include the code stream corresponding the second image sensor.

The photographing code stream may be transmitted to the camera device.

In some embodiments, the photographing code stream may further include the code stream corresponding to the first image sensor.

In some embodiments, the method may further include receiving a third photographing instruction transmitted by the image display device. The third photographing instruction may be used to control the first image sensor to perform photographing at the attitude before the camera device receives the first photographing instruction.

The first image sensor may be controlled to perform photographing according to the third photographing instruction to obtain the photographing code stream. The photographing code stream may include the code stream corresponding to the first image sensor.

The photographing code stream may be transmitted to the image display device.

In some embodiments, the photographing code stream may further include the code stream corresponding to the second image sensor.

In some embodiments, the maximum focal length of the first image sensor may be smaller than the minimum focal length of the second image sensor.

For the first photographing instruction, the position information of the target position, the first focal length, the position information of the partial area, the second photographing instruction, and the third photographing instruction, reference may be made to the description of FIG. 3 to FIG. 6, which is not repeated here.

The image control method of embodiments of the present disclosure may include receiving the first photographing instruction transmitted by the image display device, controlling the second image sensor to perform photographing according to the first photographing instruction, obtaining the display code stream, and transmitting the display code stream to the image display device. In the image control method of embodiments of the present disclosure, the zoom photographing function of smoothly switching from one image sensor of the shooting device to another image sensor may be realized, the flexibility of the zoom photographing and the image display may be improved in the scene of the plurality of image sensors, and the application scene of the zoom photographing and the image display may be expanded, which satisfies the user needs.

Figure 8:
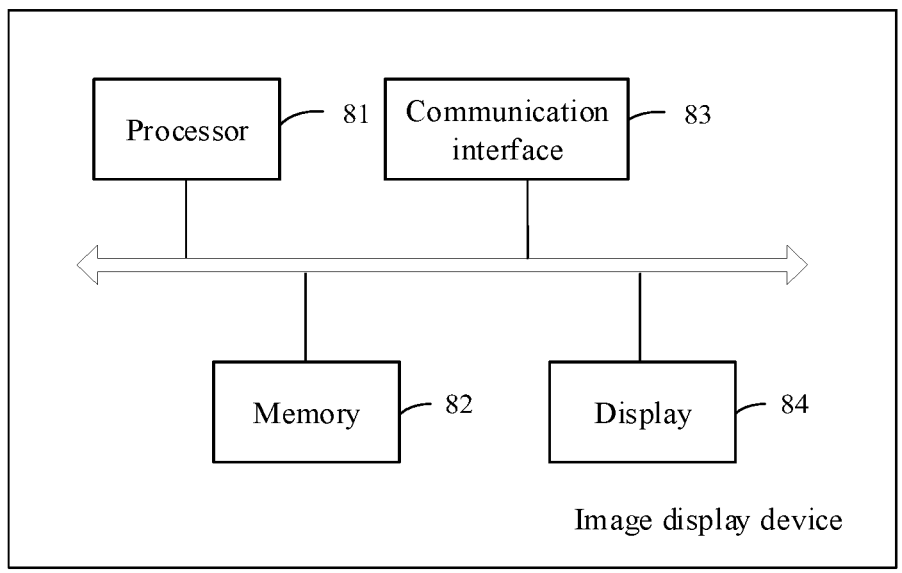
FIG. 8 is a schematic structural diagram of an image display device according to some embodiments of the present disclosure.

FIG. 8 is a schematic structural diagram of an image display device according to some embodiments of the present disclosure. Embodiments of the present disclosure provide an image display device, which may be configured to implement the image control methods provided by embodiments shown in FIG. 3 to FIG. 6 of the present disclosure. As shown in FIG. 8, the image display device includes a memory 82, a processor 81, a communication interface 83, and a display 84.

The display 84 may be configured to display the image captured by the camera device.

The memory 82 may be configured to store program codes.

The processor 81 may be configured to call the program codes. When the program codes are executed, the processor 81 may be configured to perform the following operations.

The first display instruction entered by the user may be obtained. The first display instruction may be used to instruct to perform zoom photographing on the partial area of the first image displayed in the main display window of the image display device. The first image may be obtained by the first image sensor of the camera device.

The communication interface 83 may be controlled to transmit the first photographing instruction to the camera device according to the first display instruction. The first photographing instruction may be used to instruct the second image sensor of the camera device to obtain the second image of the partial area by using the first focal length.

The communication interface 83 may be controlled to receive the display code stream transmitted by the camera device. The display code stream may include the code stream corresponding to the second image.

The second image may be displayed in the main display window according to the code stream corresponding to the second image.

In some embodiments, the processor 81 may be configured to in detection of the user performing a target position selection operation on the first image, obtain the first display instruction. The first display instruction may include the position information of the target position and the first focal length. Thus, when the main display window displays the second image, the predetermined position of the main display window may include the target position.

In some embodiment, the first photographing instruction may include the position information of the target position and the first focal length.

In some other embodiments, the first photographing instruction may include the first focal length, the distance between the target position and the predetermined position of the main display window, and the angle between the direction of the straight line where the predetermined position of the main display window and the target position are located and the reference direction.

In some embodiments, the first focal length may include any one of the minimum focal length of the second image sensor, the product of the current focal length of the first image sensor and the predetermined zoom factor, and the predetermined focal length.

In some embodiments, the processor 81 may be configured to in detection of the user performing the area selection operation on the first image, obtain the first display instruction. The first display instruction may include position information of the partial area to cause the predetermined position of the main display window when the main display window displays the second image to be the center position of the partial area.

In some embodiments, the first photographing instruction may include the position information of the partial area.

In some embodiments, the processor 81 may be configured to determine the first focal length according to the position information of the partial area.

Correspondingly, the first photographing instruction may include the position information of the partial area and the first focal length.

In some embodiments, the processor 81 may be configured to obtain the first ratio and the second ratio. The first ratio may include the ratio of the length of the partial area to the length of the main display window. The second ratio may include the ratio of the width of the partial area to the width of the main display window.

The first focal length may be determined according to the maximum value of the first ratio and the second ratio.

In some embodiments, the predetermined position of the main display window may include the center position of the main display window.

In some embodiments, the first photographing instruction may include the position information of the main display window or the position information of the predetermined position of the main display window.

In some embodiments, the processor 81 may be configured to control the communication interface 83 to receive the display code stream transmitted by the camera device.

The display code stream may include the code stream corresponding to the second image sensor.

The second image may be displayed in the main display window according to the code stream corresponding to the second image sensor.

In some embodiments, the display code stream may further include the code stream corresponding to the first image sensor. The processor 81 may be further configured to display the picture captured by the first image sensor in the secondary display window according to the code stream corresponding to the first image sensor.

In some embodiments, the size of the secondary display window may be smaller than the size of the main display window. The secondary display window may be displayed and superimposed at the predetermined area of the main display window.

In some embodiments, the processor 81 may be further configured to obtain the second display instruction entered by the user. The second display instruction may be used to instruct to perform zoom photographing on the partial area of the second image displayed in the main display window.

The communication interface 83 may be controlled to transmit the second photographing instruction to the camera device according to the second display instruction. The second photographing instruction may be used to instruct the second image sensor to obtain the third image of the partial area of the second image by using the second focal length.

In some embodiments, the processor 81 may be further configured to obtain the first return instruction entered by the user. The first return instruction may be used to instruct to display the fourth image in the main display window.

The communication interface 83 may be controlled to transmit the third photographing instruction to the camera device according to the first return instruction. The third photographing instruction may be used to control the camera device to obtain the fourth image by using the first image sensor with the attitude before receiving the first photographing instruction.

The communication interface 83 may be controlled to receive the photographing code stream transmitted by the camera device.

The fourth image may be displayed in the main display window according to the first return instruction and the photographing code stream.

In some embodiments, the processor may be further configured to obtain the second return instruction entered by the user. The second return instruction may be used to instruct to display a fifth image in the main display window. The fifth image may be obtained by the first image sensor of the camera device at the current attitude.

The communication interface 83 may be controlled to receive the photographing code stream transmitted by the camera device.

The fifth image may be displayed in the main display window according to the second return instruction and the photographing code stream.

In some embodiments, the processor 81 may be further configured to display the picture captured by the second image sensor in the secondary display window according to the photographing code stream.

In some embodiments, the maximum focal length of the first image sensor may be smaller than the minimum focal length of the second image sensor.

In some embodiments, the image display device may be connected to the control device. The instruction and/or the code stream may be transmitted between the image display device and the camera device through the control device.

The image display device of embodiments of the present disclosure may be configured to execute the image control methods of embodiments shown in FIG. 3 to FIG. 6. The technical principles and technical effects are similar, which is not repeated here.

Figure 9:
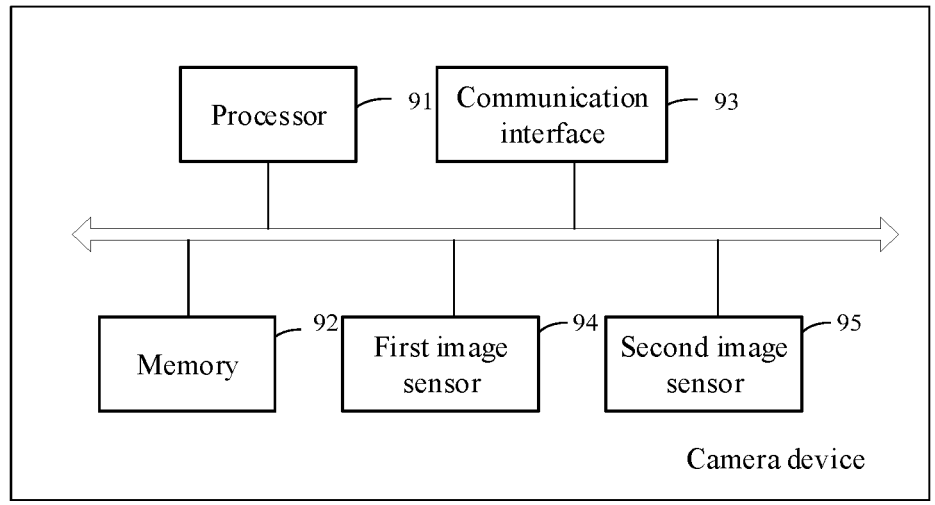
FIG. 9 is a schematic structural of a camera device according to some embodiments of the present disclosure.

FIG. 9 is a schematic structural of a camera device according to some embodiments of the present disclosure. The camera device of embodiments of the present disclosure may be configured to execute the image control methods of embodiments shown in FIG. 3 to FIG. 7 of the present disclosure. As shown in FIG. 9, the camera device includes a memory 92, a processor 91, a communication interface 93, a first image sensor 94, and a second image sensor 95.

The memory 92 may be configured to store program codes.

The processor 91 may be configured to call the program codes. When the program codes are executed, the processor 81 may be configured to perform the following operations.

The communication interface 93 may be controlled to receive the first photographing instruction transmitted by the image display device. The first photographing instruction may be used to instruct the second image sensor 95 to obtain the second image of the partial area of the first image by using the first focal length. The first image may be obtained by the first image sensor 94 and displayed in the main display window of the camera device.

The second image sensor 95 may be controlled to perform photographing according to the first photographing instruction to obtain the display code stream. The display code stream may include the code stream corresponding to the second image sensor 95.

The communication interface 93 may be controlled to transmit the display code stream to the image display device.

In some embodiments, the processor 91 may be configured to obtain the current attitude of the camera device.

The first focal length may be obtained according to the first photographing instruction. The target attitude of the camera device may be obtained according to the first photographing instruction and the current attitude of the camera device. The target attitude may be used to cause the second image sensor 95 to capture the picture of the partial area.

The second image sensor 95 may be controlled to perform photographing at the target attitude to obtain the display code stream.

In some embodiments, the first photographing instruction may include the position information of the target position in the first image and the first focal length.

In some other embodiments, the first photographing instruction may include the first focal length, the distance between the target position and the predetermined position of the main display window, and the angle between the direction of the straight line where the target position and the predetermined position of the main display window are located and the reference direction.

The target attitude may be used to cause the predetermined position of the picture captured by the second image sensor 95 to be the target position.

In some embodiments, the first focal length may include any one of the minimum focal length of the second image sensor 95, the product of the current focal length of the first image sensor 94 and the predetermined zoom factor, and the predetermined focal length.

In some embodiments, the first photographing instruction may include the position information of the partial area of the first image and the first focal length.

The target attitude may be used to cause the predetermined position of the picture captured by the second image sensor 95 to be the center position of the partial area.

In some embodiments, the first photographing instruction may include the position information of the partial area of the first image. The target attitude may be used to cause the predetermined position of the picture captured by the second image sensor 95 to be the center position of the partial area.

The processor 91 may be configured to determine the first focal length according to the position information of the partial area.

In some embodiments, the processor 91 may be configured to obtain the position information of the main display window and obtain the first ratio and the second ratio. The first ratio may include the ratio of the length of the partial area to the length of the main display window. The second ratio may include the ratio of the width of the partial area to the width of the main display window.

The first focal length may be determined according to the maximum value of the first ratio and the second ratio.

In some embodiments, the predetermined position of the picture captured by the second image sensor 95 may include the center position of the picture.

In some embodiments, the first photographing instruction may further include the position information of the main display window or the position information of the predetermined position of the main display window.

In some embodiments, the display code stream may further include the code stream corresponding to the first image sensor 94.

In some embodiments, the processor may be further configured to receive the second photographing instruction transmitted by the image display device. The second photographing instruction may be used to instruct the second image sensor 95 to obtain the third image of the partial area of the second image by using the second focal length.

The second image sensor 95 may be controlled to perform photographing according to the second photographing instruction to obtain the photographing code stream. The photographing code stream may include the code stream corresponding to the second image sensor 95.

The communication interface 93 may be controlled to transmit the photographing code stream to the camera device.

In some embodiments, the processor 91 may be further configured to control the communication interface 93 to receive the third photographing instruction transmitted by the image display device. The third photographing instruction may be used to control the first image sensor 94 to perform photographing at the attitude before the camera device receives the first photographing instruction.

The first image sensor 94 may be controlled to perform photographing according to the third photographing instruction to obtain the photographing code stream. The photographing code stream may include the code stream corresponding to the first image sensor 94.

The communication interface 93 may be controlled to transmit the photographing code stream to the image display device.

In some embodiments, the maximum focal length of the first image sensor 94 may be smaller than the minimum focal length of the second image sensor 95.

The camera device of embodiments of the present disclosure may be configured to execute the image control method of embodiments shown in FIG. 7 of the present disclosure. The technical principles and the technical effects are similar, which is not repeated here.

Embodiments of the present disclosure further provide a mobile platform. The mobile platform may include an device body and the camera device of embodiments of the present disclosure carried by the device body.

Embodiments of the present disclosure do not limit the implementation of the device body. For example, the device body may include a UAV or an unmanned vehicle.

Embodiments of the present disclosure do not limit the mounting manner of the camera device at the device body. For example, a gimbal may be arranged at the device body. The camera device may be detachably connected to the gimbal.

Figure 10:
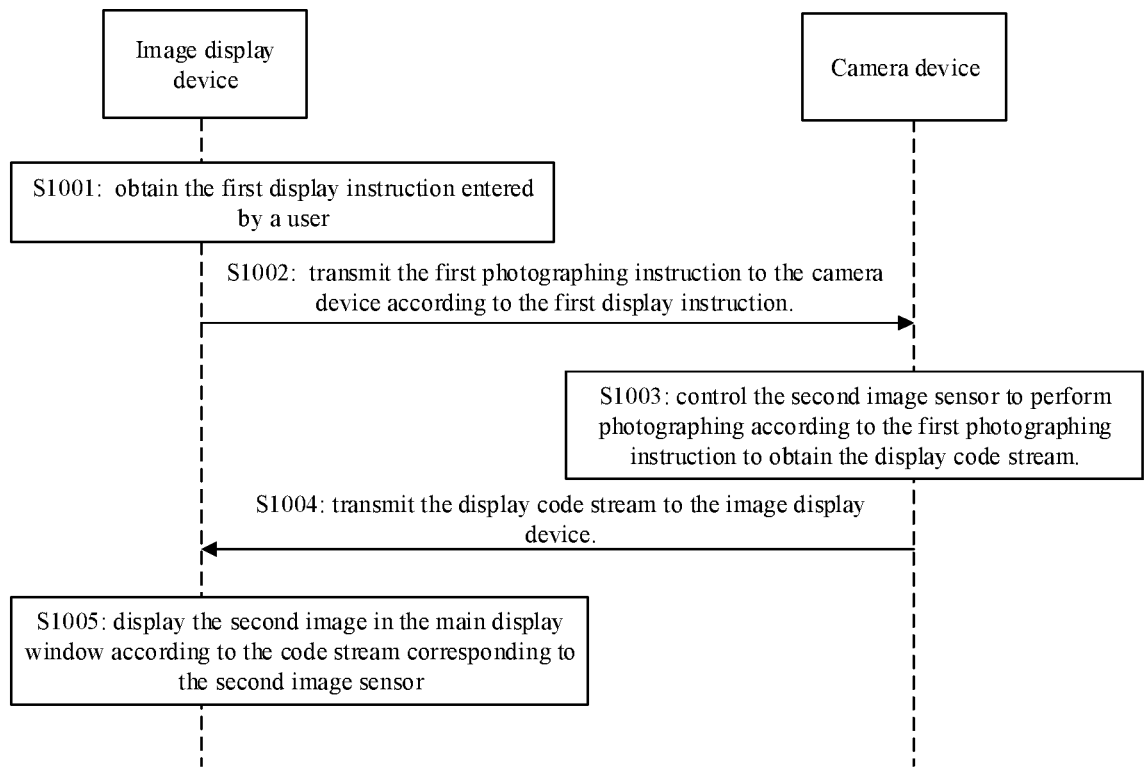
FIG. 10 is a schematic flowchart of an image control method according to some embodiments of the present disclosure.

FIG. 10 is a schematic flowchart of an image control method according to some embodiments of the present disclosure. The image control method of embodiments of the present disclosure may be applied to an image control system. The image control system may include an image display device and a camera device. As shown in FIG. 10, the image control method provided of embodiments of the present disclosure may include the following processes.

At S1001, the image display device obtains the first display instruction entered by a user.

The first display instruction may be used to instruct to perform zoom photographing on the partial area of the first image displayed in the main display window of the image display device. The first image may be obtained by the first image sensor of the camera device.

At S1002, the image display device transmits the first photographing instruction to the camera device according to the first display instruction. The first photographing instruction may be used to instruct the second image sensor of the camera device to obtain the second image of the partial area by using the first focal length.

At S1003, the camera device controls the second image sensor to perform photographing according to the first photographing instruction to obtain the display code stream. The display code stream may include the code stream corresponding to the second image sensor.

At S1004, the camera device transmits the display code stream to the image display device.

At S1005, the image display device displays the second image in the main display window according to the code stream corresponding to the second image sensor.

In some embodiments, the image display device obtaining the first display instruction entered by the user may include when the image display device detects that the user performs the target position selection operation on the first image, obtaining the first display instruction. The first display instruction may include the position information of the target position and the first focal length. Thus, when the main display window displays the second image, the predetermined position of the main display window may include the target position.

In some embodiment, the first photographing instruction may include the position information of the target position and the first focal length.

In some other embodiments, the first photographing instruction may include the first focal length, the distance between the target position and the predetermined position of the main display window, and the angle between the direction of the straight line where the predetermined position of the main display window and the target position are located and the reference direction.

In some embodiments, the first focal length may include any one of the minimum focal length of the second image sensor, the product of the current focal length of the first image sensor and the predetermined zoom factor, and the predetermined focal length.

In some embodiments, the image display device obtaining the first display instruction entered by the user may include in detection of the user performing the area selection operation on the first image, obtaining the first display instruction. The first display instruction may include position information of the partial area to cause the predetermined position of the main display window when the main display window displays the second image to be the center position of the partial area.

In some embodiments, the first photographing instruction may include the position information of the partial area.

In some embodiments, the image display device obtaining the first display instruction entered by the user may further include determining the first focal length according to the position information of the partial area.

In some embodiments, before transmitting the first photographing instruction to the camera device according to the first display instruction, the image display device obtaining the first display instruction entered by the user may further include determining the first focal length according to the position information of the partial area.

In some embodiments, the first photographing instruction may include the position information of the partial area and the first focal length.

In some embodiments, determining the first focal length according to the position information of the partial area may include obtaining the first ratio and the second ratio. The first ratio may include the ratio of the length of the partial area to the length of the main display window. The second ratio may include the ratio of the width of the partial area to the width of the main display window.

The first focal length may be determined according to the maximum value of the first ratio and the second ratio.

In some embodiments, the predetermined position of the main display window may include the center position of the main display window.

In some embodiments, the first photographing instruction may further include the position information of the main display window or the position information of the predetermined position of the main display window.

In some embodiments, the display code stream may further include the code stream corresponding to the first image sensor. The method may further include the image display device displaying the picture captured by the first image sensor in the secondary display window according to the code stream corresponding to the first image sensor.

In some embodiments, the size of the secondary display window may be smaller than the size of the main display window. The secondary display window may be displayed and superimposed at the predetermined area of the main display window.

In some embodiments, the method may further include obtaining the second display instruction entered by the user. The second display instruction may be used to instruct to perform zoom photographing on the partial area of the second image displayed in the main display window.

The image display device may transmit the second photographing instruction to the camera device according to the second display instruction. The second photographing instruction may be used to instruct the second image sensor to obtain the third image of the partial area of the second image by using the second focal length.

In some embodiments, the camera device may control the second image sensor to perform photographing according to the second photographing instruction to obtain the photographing code stream. The photographing code stream may include the code stream corresponding to the second image sensor.

The camera device may transmit the photographing code stream to the image display device.

The method may further include the image display device obtaining the first return instruction entered by the user. The first return instruction may be used to instruct to display the fourth image in the main display window.

The image display device may transmit the third photographing instruction to the camera device according to the first return instruction. The third photographing instruction may be used to control the camera device to obtain the fourth image through the first image sensor at the attitude before the camera device receives the first photographing instruction.

The camera device may control the first image sensor to perform photographing according to the third photographing instruction to obtain the photographing code stream. The photographing code stream may include the code stream corresponding to the first image sensor.

The camera device may transmit the photographing code stream to the image display device.

The image display device may display the fourth image in the main display window according to the first return instruction and the photographing code stream.

In some embodiments, the method may further include the image display device obtaining the second return instruction entered by the user. The second return instruction may be used to instruct to display the fifth image in the main display window. The fifth image may be obtained by the first image sensor of the camera device at the current attitude.

The image display device may receive the photographing code stream transmitted by the camera device.

The image display device may display the fifth image in the main display window according to the second return instruction and the photographing code stream.

In some embodiments, the method may further include the image display device displaying the picture captured by the second image sensor in the secondary display window according to the photographing code stream.

In some embodiments, the camera device controlling the second image sensor to perform photographing according to the first photographing instruction to obtain the display code stream includes the camera device obtaining the current attitude of the camera device.

The camera device may obtain the first focal length according to the first photographing instruction and obtain the target attitude of the camera device according to the first photographing instruction and the current attitude of the camera device. The target attitude may be used to cause the second image sensor to capture the picture of the partial area.

The camera device may control the second image sensor to perform photographing at the target attitude to obtain the display code stream.

In some embodiments, the maximum focal length of the first image sensor may be smaller than the minimum focal length of the second image sensor.

In some embodiments, the image display device may be connected to the control device. The instruction and/or the code stream may be transmitted between the image display device and the camera device through the control device.

For the image control method of embodiments of the present disclosure, reference may be made to the image control methods of embodiments shown in FIG. 3 to FIG. 7. The technical principles and the technical effects are similar, which is not repeated here.

Embodiments of the present disclosure further provide an image control system, which includes the image display device and the camera device.

The image display device may be configured to obtain the first display instruction entered by the user. The first display instruction may be used to instruct to perform zoom photographing on the partial area of the first image displayed in the main display window of the image display device. The first image may be obtained by the first image sensor of the camera device.

The first photographing instruction may be transmitted to the camera device according to the first display instruction. The first photographing instruction may be used to instruct the second image sensor of the camera device to obtain the second image of the partial area by using the first focal length.

The camera device may be configured to control the second image sensor to perform photographing according to the first photographing instruction to obtain the display code stream. The display code stream may include the code stream corresponding to the second image sensor.

The display code stream may be transmitted to the image display device.

The image display device may be further configured to display the second image in the main display window according to the code stream corresponding to the second image sensor.

In some embodiments, the image display device may be configured to in detection of the user performing the target position selection operation on the first image, obtain the first display instruction. The first display instruction may include the position information of the target position and the first focal length. Thus, when the main display window displays the second image, the predetermined position of the main display window may include the target position.

In some embodiment, the first photographing instruction may include the position information of the target position and the first focal length.

In some other embodiments, the first photographing instruction may include the first focal length, the distance between the target position and the predetermined position of the main display window, and the angle between the direction of the straight line where the predetermined position of the main display window and the target position are located and the reference direction.

In some embodiments, the first focal length may include any one of the minimum focal length of the second image sensor, the product of the current focal length of the first image sensor and the predetermined zoom factor, and the predetermined focal length.

In some embodiments, the image display device may be configured to in detection of the user performing the area selection operation on the first image, obtain the first display instruction. The first display instruction may include the position information of the partial area to cause the predetermined position of the main display window to be the center position of the partial area when the main display window displays the second image.

In some embodiments, the first photographing instruction may include the position information of the partial area.

In some embodiments, the image display device may be configured to obtain the first ratio and the second ratio. The first ratio may include the ratio of the length of the partial area to the length of the main display window. The second ratio may include the ratio of the width of the partial area to the width of the main display window.

The first focal length may be determined according to the maximum value of the first ratio and the second ratio.

In some embodiments, the predetermined position of the main display window may include the center position of the main display window.

In some embodiments, the first photographing instruction may further include the position information of the main display window or the position information of the predetermined position of the main display window.

In some embodiments, the display code stream may further include the code stream corresponding to the first image sensor.

The image display device may be further configured to display the picture captured by the first image sensor in the secondary display window according to the code stream corresponding to the first image sensor.

In some embodiments, the size of the secondary display window may be smaller than the size of the main display window. The secondary display window may be displayed and superimposed at the predetermined area of the main display window.

In some embodiments, the image display device may be further configured to obtain the second display instruction entered by the user. The second display instruction may be used to instruct to perform zoom photographing on the partial area of the second image displayed in the main display window.

The second photographing instruction may be transmitted to the camera device according to the second display instruction. The second photographing instruction may be used to instruct the second image sensor to obtain the third image of the partial area of the second image by using the second focal length.

In some embodiments, the camera device may be further configured to control the second image sensor to perform photographing according to the second photographing instruction to obtain the photographing code stream. The photographing code stream may include the code stream corresponding to the second image sensor.

The photographing code stream may be transmitted to the image display device.

In some embodiments, the image display device may be further configured to obtain the first return instruction entered by the user. The first return instruction may be used to instruct to display the fourth image in the main display window.

The third photographing instruction may be transmitted to the camera device according to the first return instruction. The third photographing instruction may be used to control the camera device to obtain the fourth image by using the first image sensor with the attitude before receiving the first photographing instruction.

The camera device may be further configured to control the first image sensor to perform photographing according to the third photographing instruction to obtain the photographing code stream. The photographing code stream may include the code stream corresponding to the first image sensor.

The photographing code stream may be transmitted to the image display device.

The image display device may be further configured to display the fourth image in the main display window according to the first return instruction and the photographing code stream.

In some embodiments, the image display device may be further configured to obtain the second return instruction entered by the user. The second return instruction may be used to instruct to display a fifth image in the main display window. The fifth image may be obtained by the first image sensor of the camera device at the current attitude.

The photographing code stream transmitted by the camera device may be received.

The fifth image may be displayed in the main display window according to the second return instruction and the photographing code stream.

In some embodiments, the image display device may be further configured to display the picture captured by the second image sensor in the secondary display window according to the photographing code stream.

In some embodiments, the camera device may be configured to obtain the current attitude of the camera device.

The first focal length may be obtained according to the first photographing instruction. The target attitude of the camera device may be obtained according to the first photographing instruction and the current attitude of the camera device. The target attitude may be used to cause the second image sensor to capture the picture of the partial area.

The second image sensor may be controlled to perform photographing at the target attitude to obtain the display code stream.

In some embodiments, the maximum focal length of the first image sensor may be smaller than the minimum focal length of the second image sensor.

In some embodiments, the image display device may be connected to the control device. The instruction and/or the code stream may be transmitted between the image display device and the camera device through the control device.

For the image control system of embodiments of the present disclosure, reference may be made to the image display device of embodiments shown in FIG. 8 and the camera device of embodiments shown in FIG. 9. The technical principles and technical effects are similar, which is not repeated here.

Those of ordinary skill in the art can understand that all or part of the steps in method embodiments can be implemented by a program instructing relevant hardware. The program may be stored in a computer readable storage medium. When the program is executed, the steps of method embodiments may be executed. The storage medium may include read only memory (ROM), random access memory (RAM), magnetic disk, optical disk, or other media that can store program codes.

The above embodiments are only used to illustrate the technical solutions of embodiments of the present disclosure, not to limit them. Although embodiments of the present disclosure are described in detail with reference to the above embodiments, those of ordinary skill in the art should understood that modifications may be made to technical solutions recorded in embodiments of the present disclosure, or equivalent replacements may be made to some or all of the technical features. These modifications or replacements do not cause the essence of the corresponding technical solutions to depart from the scope of the technical solutions of embodiments of the present disclosure.

What is claimed is:

1. An image control method comprising:
receiving, by a camera, a photographing instruction transmitted by an image display device, the camera including a first image sensor and a second image sensor, the photographing instruction being used to instruct the second image sensor to photograph for a partial area of a first image using a focal length to obtain a second image, and the first image being obtained by the first image sensor and displayed in a main display window of the image display device;
controlling the second image sensor to perform photographing according to the photographing instruction to obtain a display code stream, the display code stream including a code stream corresponding to the second image sensor, wherein controlling the second image sensor to perform photographing includes:
obtaining a current attitude of the camera device;
obtaining the focal length according to the photographing instruction;
obtaining a target attitude of the camera device according to the photographing instruction and the current attitude of the camera device, the target attitude being used to cause the second image sensor to capture a picture of the partial area; and
controlling the second image sensor to perform photographing at the target attitude to obtain the display code stream; and
transmitting the display code stream to the image display device.

2. The method of claim 1, wherein:
the photographing instruction includes:
position information of a target position in the first image and the focal length, or
the focal length, a distance between the target position and a predetermined position of the main display window, and an angle between a direction of a straight line where the target position and the predetermined position of the main display window are located and a reference direction; and
the target attitude is used to cause a predetermined position of a picture captured by the second image sensor to be the target position.

3. The method of claim 2, wherein the focal length includes any one of:
a minimum focal length of the second image sensor, a product of a current focal length of the first image sensor and a predetermined zoom factor, and a predetermined focal length.

4. The method of claim 2, wherein the predetermined position of the picture captured by the second image sensor includes a center position of the picture.

5. The method of claim 2, wherein the photographing instruction further includes position information of the main display window or position information of the predetermined position of the main display window.

6. The method of claim 1, wherein:
the photographing instruction includes position information of the partial area of the first image and the focal length; and
the target attitude is used to cause a predetermined position of a picture captured by the second image sensor to be a center position of the partial area.

7. The method of claim 1, wherein:
the photographing instruction includes position information of the partial area of the first image, the target attitude being used to cause a predetermined position of a picture captured by the second image sensor to be a center position of the partial area; and
obtaining the focal length according to the photographing instruction includes determining the focal length according to the position information of the partial area.

8. The method of the claim 7, wherein determining the focal length according to the position information of the partial area includes:
   obtaining position information of the main display window;
   obtaining a first ratio and a second ratio, the first ratio including a ratio of a length of the partial area to a length of the main display window, and the second ratio including a ratio of a width of the partial area to a width of the main display window; and
   determining the focal length according to a larger one of the first ratio and the second ratio.

9. The method of claim 1, wherein the display code stream further includes a code stream corresponding to the first image sensor.

10. The method of claim 1,
   wherein the photographing instruction is a first photographing instruction, and the focal length is a first focal length;
   the method further comprising:
      receiving a second photographing instruction transmitted by the image display device, the second photographing instruction being used to instruct the second image sensor to obtain a third image of a partial area of the second image using a second focal length;
      controlling the second image sensor to perform photographing according to the second photographing instruction to obtain a photographing code stream, the photographing code stream including the code stream corresponding to the second image sensor; and
      transmitting the photographing code stream to the image display device.

11. The method of the claim 1,
   wherein the photographing instruction is a first photographing instruction;
   the method further comprising:
      receiving a second photographing instruction transmitted by the image display device, the second photographing instruction being used to control the first image sensor to perform photographing at an attitude before the camera device receives the first photographing instruction;
      controlling the first image sensor to perform photographing according to the second photographing instruction to obtain a photographing code stream, the photographing code stream including a code stream corresponding to the first image sensor; and
      transmitting the photographing code stream to the image display device.

12. The method of claim 1, wherein a maximum focal length of the first image sensor is smaller than a minimum focal length of the second image sensor.

13. A camera device comprising:
   a communication interface;
   a first image sensor;
   a second image sensor;
   a processor; and
   a memory storing program codes that, when executed by the processor, cause the processor to:
      control the communication interface to receive a photographing instruction transmitted by an image display device, the photographing instruction being used to instruct the second image sensor to photograph for a partial area of a first image using a focal length to obtain a second image, and the first image being obtained by the first image sensor and displayed in a main display window of the image display device;
      control the second image sensor to perform photographing according to the photographing instruction to obtain a display code stream, the display code stream including a code stream corresponding to the second image sensor, wherein controlling the second image sensor to perform photographing includes:
         obtaining a current attitude of the camera device;
         obtaining the focal length according to the photographing instruction;
         obtaining a target attitude of the camera device according to the photographing instruction and the current attitude of the camera device, the target attitude being used to cause the second image sensor to capture a picture of the partial area; and
         controlling the second image sensor to perform photographing at the target attitude to obtain the display code stream; and
      control the communication interface to transmit the display code stream to the image display device.

14. The device of claim 13, wherein:
   the photographing instruction includes:
      position information of a target position in the first image and the focal length, or
      the focal length, a distance between the target position and a predetermined position of the main display window, and an angle between a direction of a straight line where the target position and the predetermined position of the main display window are located and a reference direction; and
   the target attitude is used to cause a predetermined position of a picture captured by the second image sensor to be the target position.

15. The device of claim 14, wherein the photographing instruction further includes position information of the main display window or position information of the predetermined position of the main display window.

16. The device of claim 13, wherein the photographing instruction is a first photographing instruction, the focal length is a first focal length, and the processor is further caused to:
   receive a second photographing instruction transmitted by the image display device, the second photographing instruction being used to instruct the second image sensor to obtain a third image of a partial area of the second image using a second focal length;
   control the second image sensor to perform photographing according to the second photographing instruction to obtain a photographing code stream, the photographing code stream including the code stream corresponding to the second image sensor; and
   transmit the photographing code stream to the image display device.

17. The device of the claim 13, wherein the photographing instruction is a first photographing instruction, and the processor is further caused to:
   receive a second photographing instruction transmitted by the image display device, the second photographing instruction being used to control the first image sensor to perform photographing at an attitude before the camera device receives the first photographing instruction;
   control the first image sensor to perform photographing according to the second photographing instruction to obtain a photographing code stream, the photographing code stream including a code stream corresponding to the first image sensor; and transmit the photographing code stream to the image display device.

18. The device of claim 13, wherein a maximum focal length of the first image sensor is smaller than a minimum focal length of the second image sensor.

* * * * *